(12) United States Patent
Ma et al.

(10) Patent No.: US 9,829,632 B2
(45) Date of Patent: Nov. 28, 2017

(54) BENT AND TAPERED OPTICAL WAVEGUIDE FOR MODE CONVERTER AND POLARIZATION ROTATOR

(71) Applicant: Coriant Advanced Technology, LLC, New York, NY (US)

(72) Inventors: Yangjin Ma, Brooklyn, NY (US); Michael J. Hochberg, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 14/988,829

(22) Filed: Jan. 6, 2016

(65) Prior Publication Data

US 2016/0377807 A1   Dec. 29, 2016

Related U.S. Application Data (63) Continuation-in-part of application No. 14/754,105, filed on Jun. 29, 2015.

(51) Int. Cl.
| | | |
|---|---|---|
| G02B 6/14 | (2006.01) | |
| G02B 6/122 | (2006.01) | |
| G02B 6/126 | (2006.01) | |
| G02B 6/12 | (2006.01) | |

(52) U.S. Cl.
CPC ............. *G02B 6/126* (2013.01); *G02B 6/122* (2013.01); *G02B 6/1228* (2013.01); *G02B 6/14* (2013.01); *G02B 2006/12119* (2013.01); *G02B 2006/12152* (2013.01); *G02B 2006/12195* (2013.01)

(58) Field of Classification Search
CPC .................. G02B 6/126; G02B 6/1228; G02B 2006/12152; G02B 2006/12119; G02B 6/2766; G02B 6/2726; G01M 11/33
USPC ............................................... 385/31–49, 147
See application file for complete search history.

(56) References Cited

U.S. PATENT DOCUMENTS

| | | | | |
|---|---|---|---|---|
| 7,333,691 | B1 * | 2/2008 | Gill ........................ | B82Y 20/00 |
| | | | | 359/344 |
| 8,873,899 | B2 * | 10/2014 | Anderson ................ | G02B 6/27 |
| | | | | 385/11 |
| 9,069,194 | B2 * | 6/2015 | Onishi ................... | G02F 1/0136 |
| 9,122,006 | B1 * | 9/2015 | Roth ....................... | G02B 6/126 |
| 9,128,242 | B2 * | 9/2015 | Kojima ................... | G02B 6/14 |
| 9,329,344 | B2 * | 5/2016 | Anderson ................ | G02B 6/27 |
| 9,470,844 | B1 * | 10/2016 | Ma .......................... | G02B 6/126 |
| 2002/0122630 | A1 * | 9/2002 | Bona ................... | G02B 6/12007 |
| | | | | 385/43 |

(Continued)

OTHER PUBLICATIONS

Dai et al.; "Novel Concept for Ultracompact Polarization Splitter-rotator Based on Silicon Nanowires"; Optics Express; vol. 19, No. 11; May 23, 2011; (10 pages).

(Continued)

*Primary Examiner* — Akm Enayet Ullah
(74) *Attorney, Agent, or Firm* — Nixon Peabody LLP (57) ABSTRACT

A bent taper is provided that includes one or more waveguide bends, at least one of which has a tapering waveguide width along at least a portion thereof. In one embodiment, the bent taper is an S-shaped bent taper that is configured as a TE0-TE1 mode convertor. Such a bent taper can be combined with a linear bi-layer taper configured as a TM0-TE1 mode converter to form a TM0-TE0 polarization rotator.

18 Claims, 13 Drawing Sheets

(56) References Cited

U.S. PATENT DOCUMENTS

| | | | |
|---|---|---|---|
| 2003/0081903 A1* | 5/2003 | Vahala | G02B 6/126 385/50 |
| 2004/0071384 A1 | 4/2004 | Heim | |
| 2006/0083461 A1* | 4/2006 | Takahashi | G02B 6/1228 385/28 |
| 2010/0074063 A1* | 3/2010 | Peng | G11B 5/02 369/13.32 |
| 2010/0158443 A1* | 6/2010 | Jeong | G02B 6/1228 385/50 |
| 2013/0223795 A1* | 8/2013 | Sasaoka | G02B 6/2552 385/32 |
| 2014/0133796 A1 | 5/2014 | Dong | |

OTHER PUBLICATIONS

Sacher et al.; "Polarization Rotator-Splitters in Standard Active Silicon Photonics Platforms"; Optics Express 3777; vol. 22, No. 4; Feb. 24, 2014; (10 pages).
International Search Report, PCT/US2016/040213, date of mailing Sep. 28, 2016 (5 pages).
Written Opinion of the International Searching Authority, PCT/US2016/040213, date of mailing Sep. 28, 2016 (5 pages).

* cited by examiner

BENT AND TAPERED OPTICAL WAVEGUIDE FOR MODE CONVERTER AND POLARIZATION ROTATOR

CROSS-REFERENCE TO RELATED APPLICATIONS

This application is a continuation-in-part of and claims priority to U.S. patent application Ser. No. 14/754,105, filed Jun. 29, 2015, which is hereby incorporated by reference herein in its entirety.

FIELD OF THE INVENTION

The present invention relates to optical waveguide components including a taper. More particularly, the present invention relates to optical waveguide components including a bent taper.

BACKGROUND OF THE INVENTION

In the field of integrated optics, conventional linear tapers are used for various purposes, such as adiabatic mode-size conversion, edge coupling, and mode conversion. For example, linear bi-layer tapers configured as TM0-TE1 mode converters are described in D. Dai and J. E. Bowers, Opt. Express 19, 10940 (2011), and in W. D. Sacher, T. Barwicz, B. J. F. Taylor, and J. K. S. Poon, Opt. Express 22, 3777 (2014), each of which is hereby incorporated by reference herein in its entirety. On the other hand, when waveguide bending is desired, single-mode waveguide bends are conventionally used to avoid multimode mixing.

There is a need for improved tapers for use in optical waveguide components, for example, with lower loss, lower back-reflection, higher optical bandwidth, and/or other improvements.

SUMMARY OF THE INVENTION

Accordingly, one aspect of the present invention relates to an optical waveguide component comprising: a bent taper having a first port and a second port, the bent taper comprising a first waveguide bend proximate to the first port, the first waveguide bend tapered along at least a portion thereof proximate to the first port, the tapered portion having a waveguide width that tapers towards the first port.

The foregoing and other objects, aspects, features, and advantages of the invention will become more apparent from the following description and from the claims.

BRIEF DESCRIPTION OF THE DRAWINGS

The objects and features of the present invention can be better understood with reference to the drawings described below, and the claims. The drawings are not necessarily to scale, emphasis instead generally being placed upon illustrating the principles of the present invention. In the drawings, like numerals are used to indicate like parts throughout the various views.

DETAILED DESCRIPTION

We describe herein a bent taper that can be included in an optical waveguide component, such as a polarization rotator. The bent taper includes one or more waveguide bends, at least one of which has a tapering waveguide width along at least a portion thereof. The bent taper may be S-shaped, L-shaped, or may have some other bent shape.

Typically, the bent taper has a first port, i.e., a first end, and a second port, i.e., a second end, and includes a first waveguide bend proximate to the first port. The first waveguide bend is tapered along at least a portion thereof proximate to the first port, and the tapered portion has a waveguide width that tapers towards the first port. The waveguide width of the tapered portion may taper symmetrically or asymmetrically with respect to a center arc of the first waveguide bend, at a substantially constant rate or at a varying rate.

Also typically, the bent taper is a multimode bent taper that transitions from single-mode at the first port to multi-mode at the second port. Accordingly, the waveguide width of the tapered portion typically tapers from a multimode waveguide width to a single-mode waveguide width. By controlling the geometry of the bent taper, the multimode region of the bent taper can be used to provide a variety of functions.

In some embodiments, the bent taper is configured as a mode converter. In the field of integrated optics, mode converters can be used to realize polarization-diversified photonic integrated circuits (PICs). In some embodiments, the bent taper is configured for use in a polarization rotator, which may form part of a polarization controller or a polarization-diversified PIC, such as a transceiver, for example. Some embodiments of the bent taper can be used in multiplexing applications such as mode-division multiplexing (MDM), wavelength-division multiplexing (WDM), polarization-division multiplexing (PDM), or combinations thereof.

Figure 1:
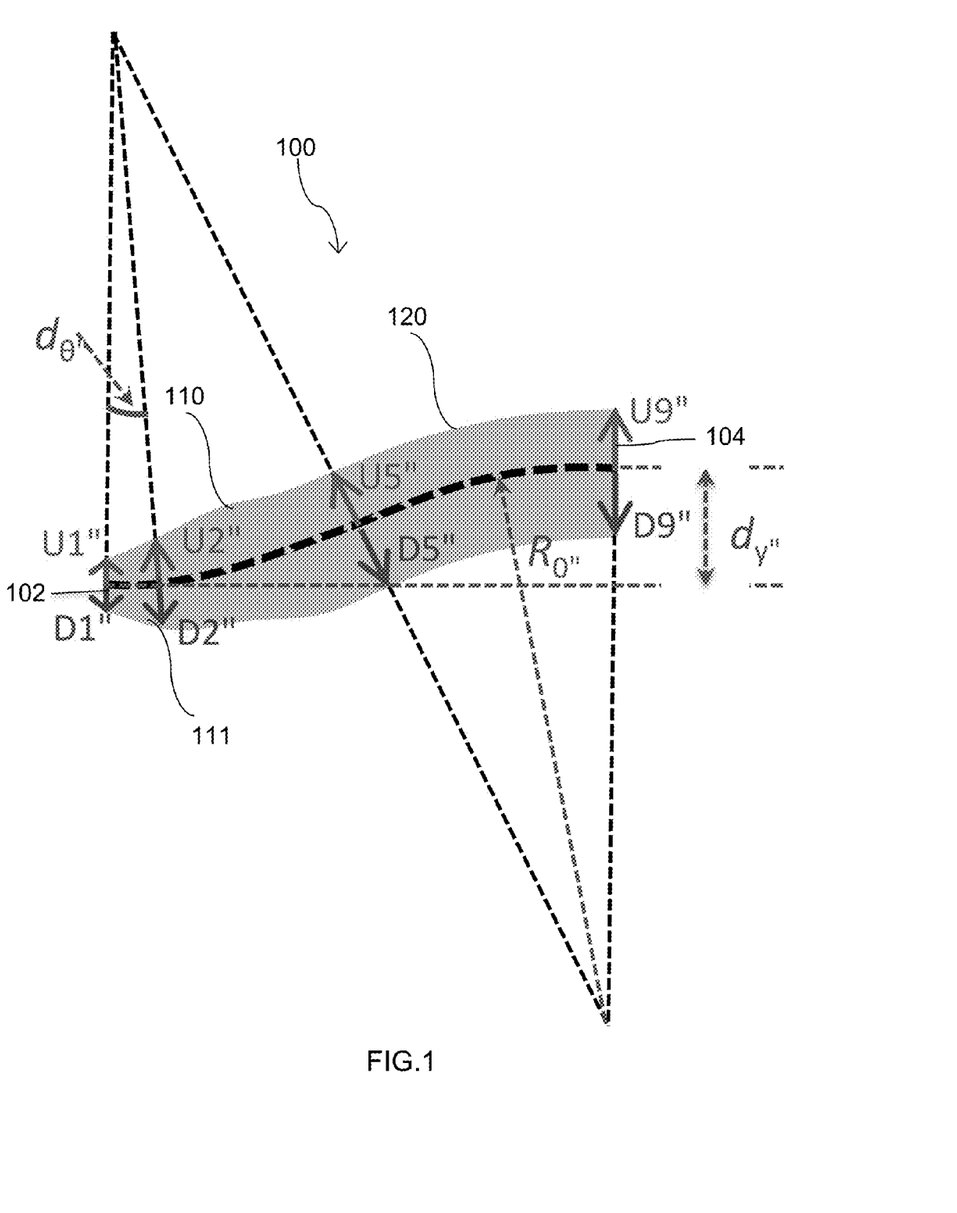
FIG. 1 is a schematic diagram of a top view of an S-shaped bent taper.

FIG. 1 is a schematic diagram of an S-shaped bent taper 100. The bent taper 100 has a narrower first port 102 and a wider second port 104, and includes a first in-plane waveguide bend 110 proximate to the first port 102, and a second in-plane waveguide bend 120 connected to the first waveguide bend 110 and proximate to the second port 104. The first waveguide bend 110 and the second waveguide bend 120 have opposite curvature directions and form an S-bend. The first waveguide bend 110 includes a tapered portion 111 proximate to the first port 102, having a waveguide width that tapers towards the first port 102. As the bent taper 100 is reciprocal, either of the first port 102 and the second port 104 may serve as an input port to the bent taper 100, and the other of the first port 102 and the second port 104 may serve as an output port to the bent taper 100.

In some embodiments, the first waveguide bend 110 and the second waveguide bend 120 are circular waveguide bends that typically have a substantially same center radius of curvature $R_0$. In such embodiments, the S-bend of the bent taper 100 may be defined by three parameters: the center radius of curvature $R_0$ measured to a center arc of each waveguide bend, a lateral offset $d_y$ measured as a lateral distance between the centers of the first port 102 and the second port 104, and a waveguide width (Ui+Di) that varies along at least a portion of the S-bend. It should be noted that the first port 102 and the second port 104 may also be offset in angle.

The bent taper 100 may be configured as a mode converter. Typically, the bent taper 100 is configured to provide mode conversion between a fundamental transverse electric (TE0) mode and an intermediate mode, e.g., a higher-order transverse electric (TE) mode. In some embodiments, the bent taper 100 is configured as a TE0-TE1 mode converter that provides mode conversion between a TE0 mode and a first-order transverse electric (TE1) mode. For example, when used to provide TE0-to-TE1 mode conversion, the bent taper 100 is configured to receive a TE0 mode via the first port 102, which serves as an input port, to convert the TE0 mode to a TE1 mode, and to provide the TE1 mode via the second port 104, which serves as an output port.

TE modes are defined as those with an electric field parallel to the chip plane, and transverse magnetic (TM) modes are defined as those with a magnetic field parallel to the chip plane. In some instances, the TE and TM modes are quasi-TE and quasi-TM modes.

The bent taper 100 may be designed by decomposing the S-bend into a plurality of segments of equal angular measure $d_0$, optimizing the waveguide widths at the segment boundaries, and interpolating the waveguide width between the segment boundaries to make the transitions smooth. In other embodiments, segments of different angular measures may be used, for example. The waveguide width is defined relative to the center arcs described by the center radius of curvature $R_0$. The center arcs divide the S-bend into a first side, referred to as the up side, and a second side, referred to as the down side. Asymmetric waveguide widths may be used to increase the optimization freedom. In other embodiments, symmetric waveguide widths may be used. A particle swarm optimization (PSO) may be used during a finite-difference time-domain (FDTD) simulation to determine an optimized geometry for the bent taper 100.

In the embodiment illustrated in FIG. 1, the S-bend was decomposed into eight segments, and asymmetric waveguide widths were optimized. Therefore, two sets of independent waveguide width parameters were used, {U1, U2, U3, . . . , U9} on the up side of the S-bend and {D1, D2, D3, . . . , D9} on the down side of the S-bend, as shown in FIG. 1. The waveguide width of the bent taper 100 at a location i, i.e., a segment boundary, is the sum of the respective Ui and Di parameters at that location.

A bent taper 100 configured as a TE0-TE1 mode converter with ultra-high efficiency was realized by only varying the waveguide widths (U2+D2) and (U3+D3). The waveguide width (U1+D1) at the narrow first port 102 was set to a standard width of a single-mode waveguide. In this embodiment, the waveguide width of the first three segments, i.e., the tapered portion 111, tapers towards the first port 102 and is asymmetric with respect to the center arc of the first waveguide bend 110. The waveguide width of the last five segments, i.e., the non-tapered portion, is substantially constant at a waveguide wide of the second port 104. When the lateral offset $d_y$ was set to 1.2 µm, a center radius of curvature $R_0$ of about 8.5 µm was found after optimization. The device length of the bent taper 100 was only about 6.3 µm. Typically, the bent taper 100 has a device length of less than about 10 µm.

Figure 2A:
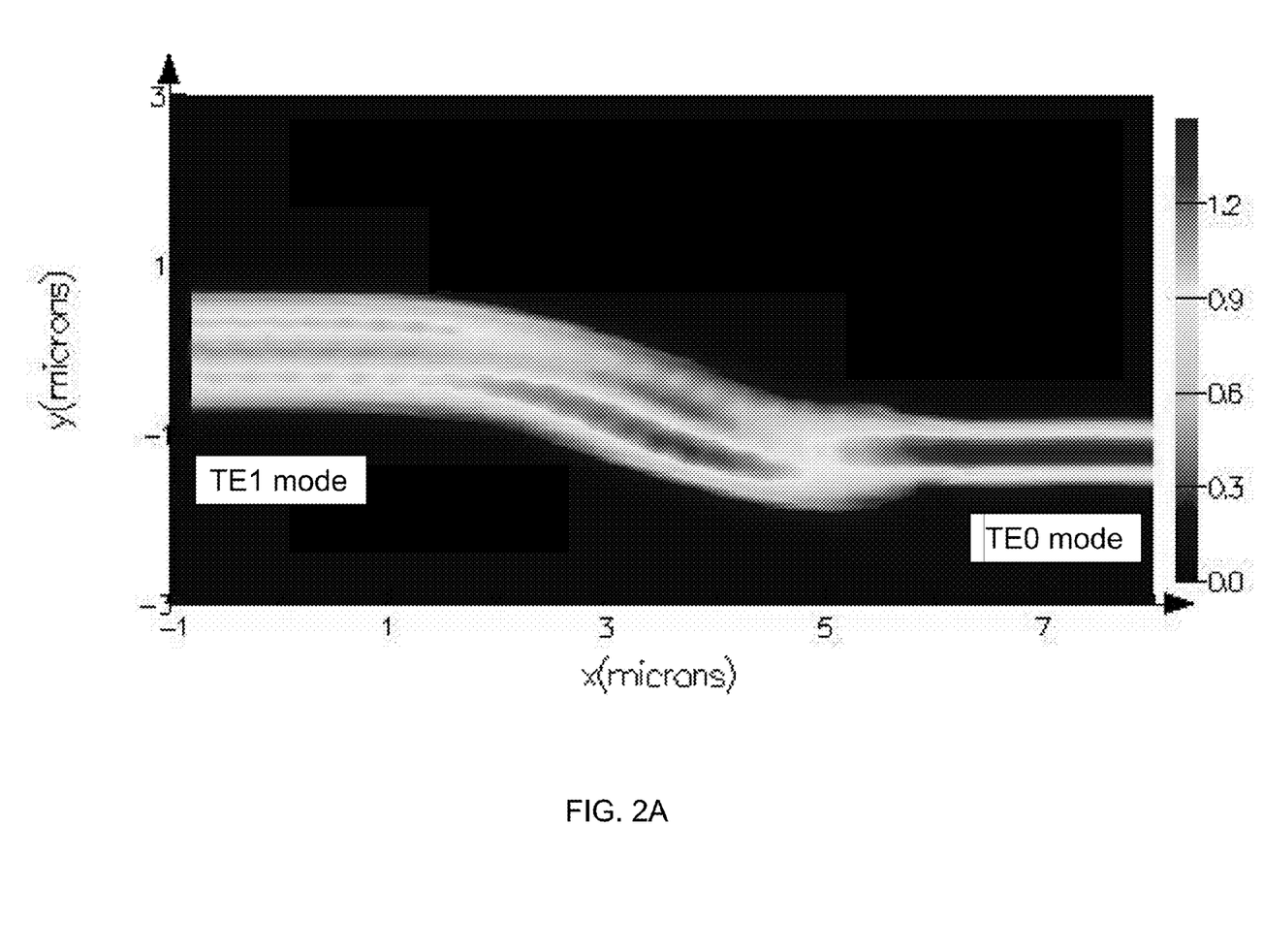
FIG. 2A is a plot of a simulated electric-field distribution of an S-shaped bent taper configured as a TE0-TE1 mode convertor.
Figure 2B:
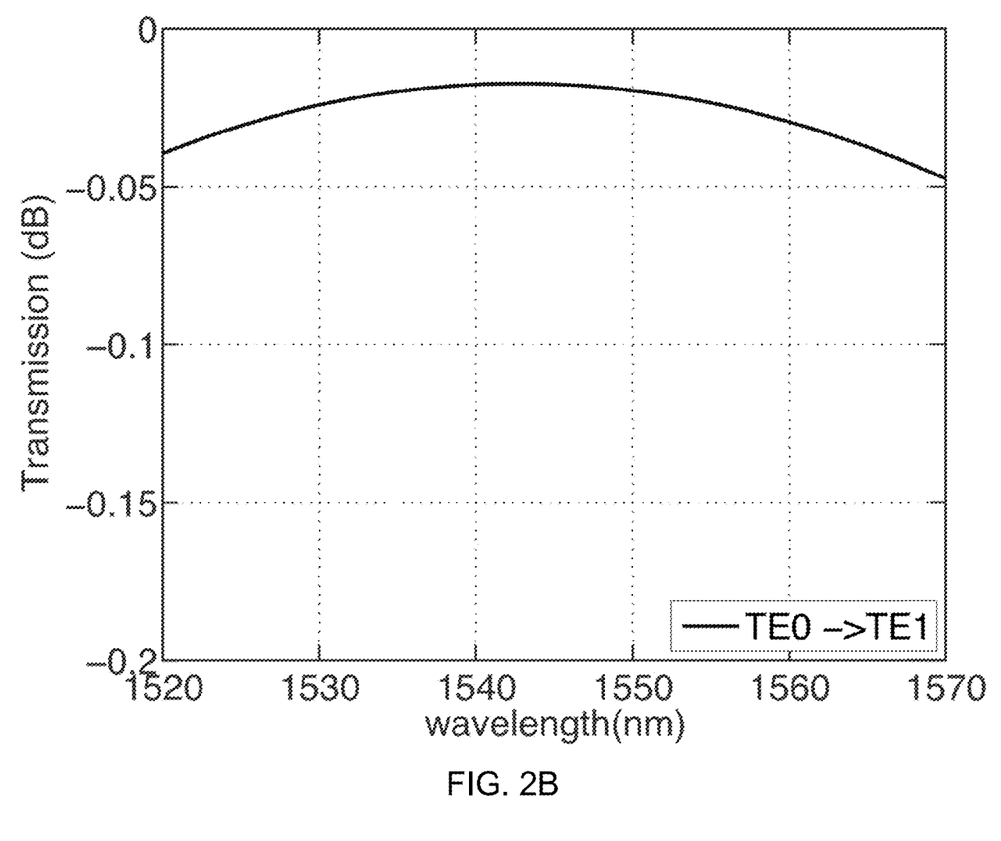
FIG. 2B is a plot of simulated TE0-to-TE1 mode-conversion loss as a function of wavelength of the bent taper of FIG. 2A.

FIG. 2A is a plot of a simulated electric-field distribution for an S-shaped bent taper configured as a TE0-TE1 mode converter. The electric field transitions from the TE1 mode at the second port, at the left side of FIG. 2A, to the TE0 mode at the first port, at the right side of FIG. 2A, without notable scattering loss. FIG. 2B is a plot of simulated TE0-to-TE1 mode-conversion loss as a function of wavelength of the bent taper of FIG. 2A. In the embodiment illustrated, the TE0-to-TE1 mode-conversion loss is less than about 0.05 dB, corresponding to a TE0-to-TE1 mode-conversion efficiency of greater than about 98.8%, across the C-band.

Figure 3:
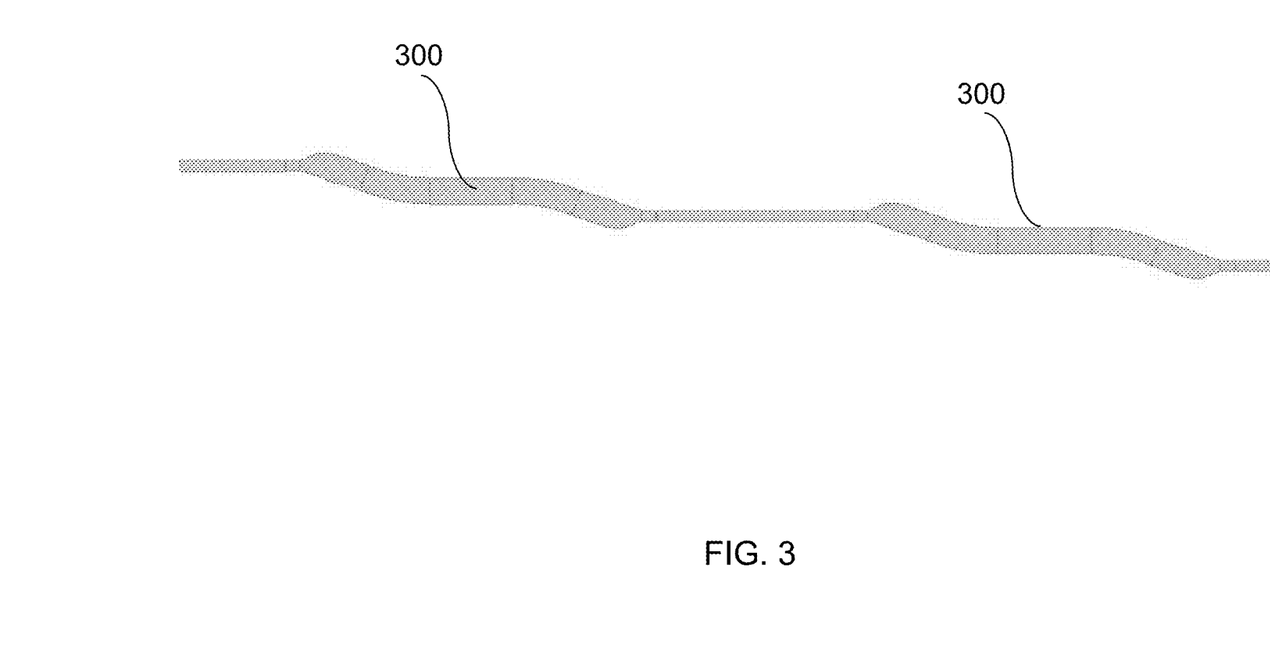
FIG. 3 is a schematic diagram of a test structure for measuring an insertion loss of an S-shaped bent taper.

FIG. 3 is a schematic diagram of a test structure for measuring an insertion loss of a bent taper, such as the S-shaped bent taper of FIG. 1, e.g., at the wafer scale. The test structure includes at least one pair 300 of connected bent tapers that are substantially identical, but oppositely oriented, with their second ports connected. By cascading a plurality of such bent-taper pairs 300, the accuracy of the insertion-loss measurement may be increased. In some embodiments, a plurality of such test structures are formed, each with a different number of bent-taper pairs 300, and the insertion loss per device is determined by analyzing the transmission data for each of the test structures.

A bent taper, such as the S-shaped bent taper 100 of FIG. 1, configured as a mode converter can be combined in optical communication with a mode-conversion element to form a polarization rotator. Typically, the polarization rotator is a TM0-TE0 polarization rotator that is configured to provide polarization rotation between a fundamental transverse magnetic (TM0) and a TE0 mode. For example, when used to provide TM0-to-TE0 polarization rotation, the mode-conversion element is configured to receive a TM0 mode via an input port of the mode-conversion element, to convert the TM0 mode to an intermediate mode, and to provide the intermediate mode via an output port of the mode-conversion element, and the bent taper is configured to receive the intermediate mode via the second port of the bent taper, to convert the intermediate mode to TE0 mode, and to provide the TE0 mode via the first port of the bent taper.

Figures 4, 5A, 5B:
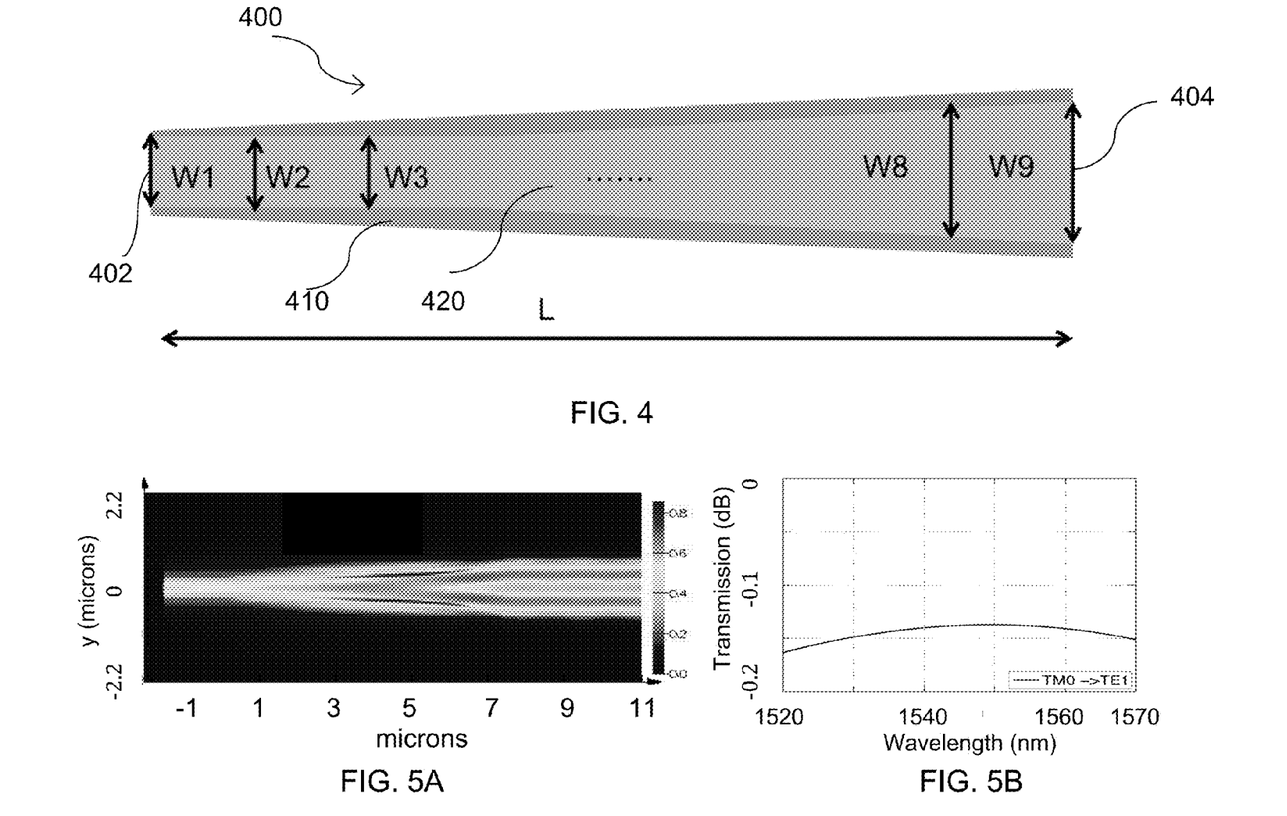
FIG. 4 is a schematic diagram of a top view of a bi-layer taper.
FIG. 5A is a plot of a simulated electric-field distribution of a bi-layer taper configured as a TM0-TE1 mode convertor.
FIG. 5B is a plot of simulated TE0-to-TE1 mode-conversion loss as a function of wavelength of the bi-layer taper of FIG. 5A.

A linear bi-layer taper can be used as the mode-conversion element in the polarization rotator. FIG. 4 is a schematic diagram of a bi-layer taper 400. The bi-layer taper 400 has a narrower input port 402 and a wider output port 404, and includes a first layer 410, e.g., a slab, and a second layer 420, e.g., a ridge, overlying the first layer 410. The first layer 410 and the second layer 420 typically have different layer thicknesses and different, varying layer widths.

The bi-layer taper 400 may be configured as a mode converter. Typically, the bi-layer taper 400 is configured to provide mode conversion between a TM0 mode and an intermediate mode. In some embodiments, the bi-layer taper 400 is configured as a TM0-TE1 that provides mode conversion between a TM0 mode and a TE1 mode. For example, when used to provide TM0-to-TE1 mode conversion, the bi-layer taper 400 is configured to receive a TM0 mode via the input port 402, to convert the TM0 mode to a TE1 mode, and to provide the TE1 mode via the output port 404.

The bi-layer taper 400 may be designed by decomposing each layer 410 or 420 into a plurality of layer segments of equal length, optimizing the layer widths at the segment boundaries, and interpolating the waveguide width between the segment boundaries to make the transitions smooth. In other embodiments, layer segments of different lengths may be used, for example. A PSO may be used during an FDTD simulation to determine an optimized geometry for the bi-layer taper 400.

In the embodiment illustrated in FIG. 4, each layer 410 or 420 was decomposed into eight waveguide segments. Two sets of layer widths {W1, W2, W3, . . . , W9} were optimized, and an ultra-short bi-layer taper 400 was achieved. The first layer 410 has a layer width that continuously tapers from the output port 404 to the input port 402, whereas the second layer 420 has a layer width that initially tapers and then widens on going from the output port 404 to the input port 402. In one embodiment, the device length of the bi-layer taper 400 was only about 9 μm, considerably smaller than the device lengths of prior-art bi-layer tapers. Even with the short device length, the TM0-to-TE1 mode-conversion loss of the bi-layer taper 400 was less than about 0.2 dB across the C-band. Typically, the bi-layer taper 400 has a device length of less than about 20 μm on a 200 nm-thick silicon-on-insulator (SOI) platform. It should be noted that, although the bi-layer taper 400 of FIG. 4 typically has a short device length, a longer taper, e.g., a linear adiabatic taper, could alternatively be used to perform the same function as the bi-layer taper 400 and combined with a bent taper to form a polarization rotator.

FIG. 5A is a plot of a simulated electric-field distribution of a bi-layer taper configured as a TM0-TE1 mode converter. FIG. 5B is a plot of simulated TM0-to-TE1 mode-conversion loss as a function of wavelength of the bi-layer taper of FIG. 5A.

A bi-layer taper, such as the bi-layer taper 400 of FIG. 4, and a bent taper, such as the S-shaped bent taper 100 of FIG. 1, can be combined, such that the output port of the bi-layer taper is connected to the second port of the bent taper. In some embodiments, a bi-layer taper configured as a TM0-TE1 mode converter is combined with a bent taper configured as a TE0-TE1 mode converter to form a TM0-TE0 polarization rotator. Such a TM0-TE0 polarization rotator can be used in a polarization controller or a polarization-diversified PIC, such as a transceiver, for example.

Figure 6A:
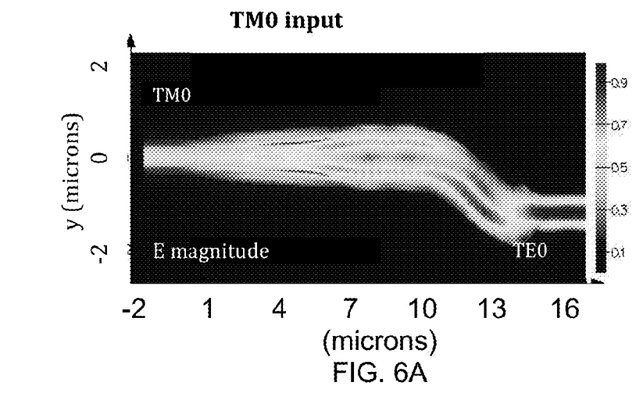
FIG. 6A is a plot of a simulated electric-field distribution of a TM0-TE0 polarization rotator with an input TM0 mode.
Figure 6B:
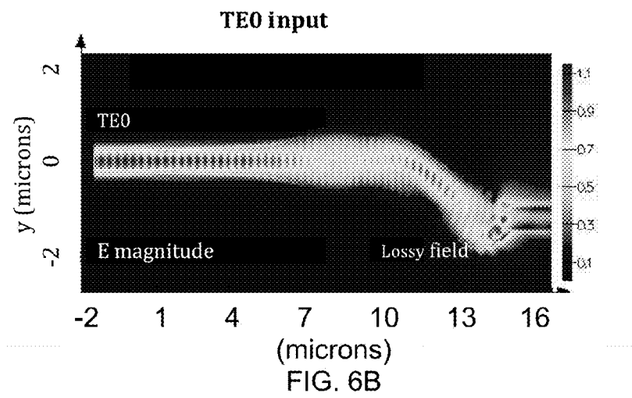
FIG. 6B is a plot of a simulated electric-field distribution of the polarization rotator of FIG. 6A with an input TE0 mode.
Figure 6C:
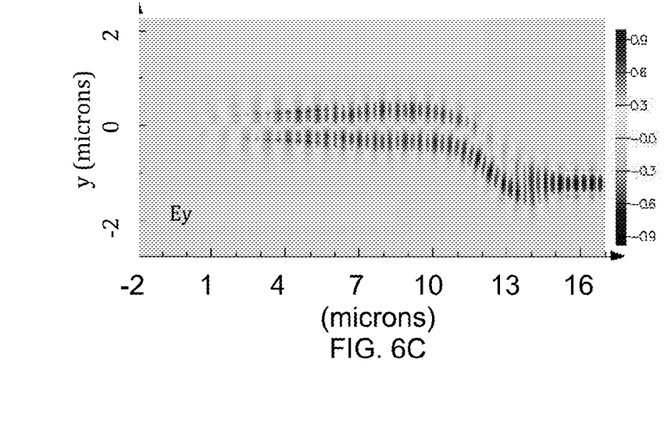
FIG. 6C is a plot of the Ey component of the simulated electric-field distribution of FIG. 6A.
Figure 6D:
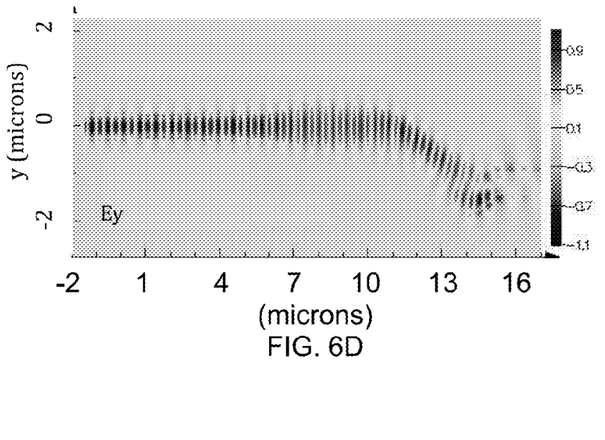
FIG. 6D is a plot of the Ey component of the simulated electric-field distribution of FIG. 6B.

FIG. 6A is a plot of a simulated electric-field distribution of such a TM0-TE0 polarization rotator with an input TM0 mode. FIG. 6B is a plot of a simulated electric-field distribution of the polarization rotator of FIG. 6A with an input TE0 mode. FIG. 6C is a plot of the Ey component of the simulated electric-field distribution of FIG. 6A. FIG. 6D is a plot of the Ey component of the simulated electric-field distribution of FIG. 6B.

When the polarization rotator receives a TM0 mode as an input signal, via the input port of the bi-layer taper, at the left side of FIG. 6A, the TM0 mode is converted to a TE1 mode by the bi-layer taper. The TE1 mode is then converted to a TE0 mode by the bent taper, and the TE0 mode emerges from the polarization rotator, via the first port of the bent taper, at the right side of FIG. 6A. However, when the polarization rotator receives a TE0 mode as an input signal, at the left side of FIG. 6B, the TE0 mode propagates along the bi-layer taper and gets scattered at the bent taper, as shown in the right half of FIG. 6B.

Figure 6E:
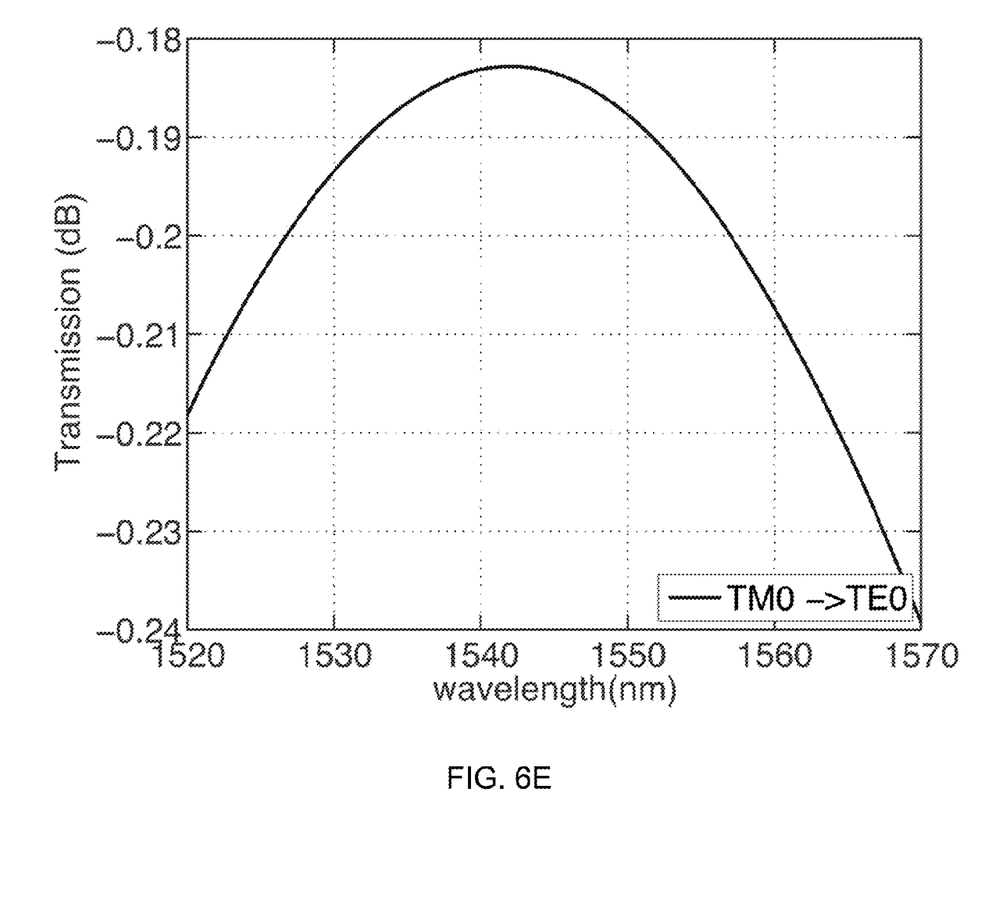
FIG. 6E is a plot of simulated TM0-to-TE0 polarization-rotation loss as a function of wavelength of the polarization rotator of FIG. 6A.
Figure 6F:
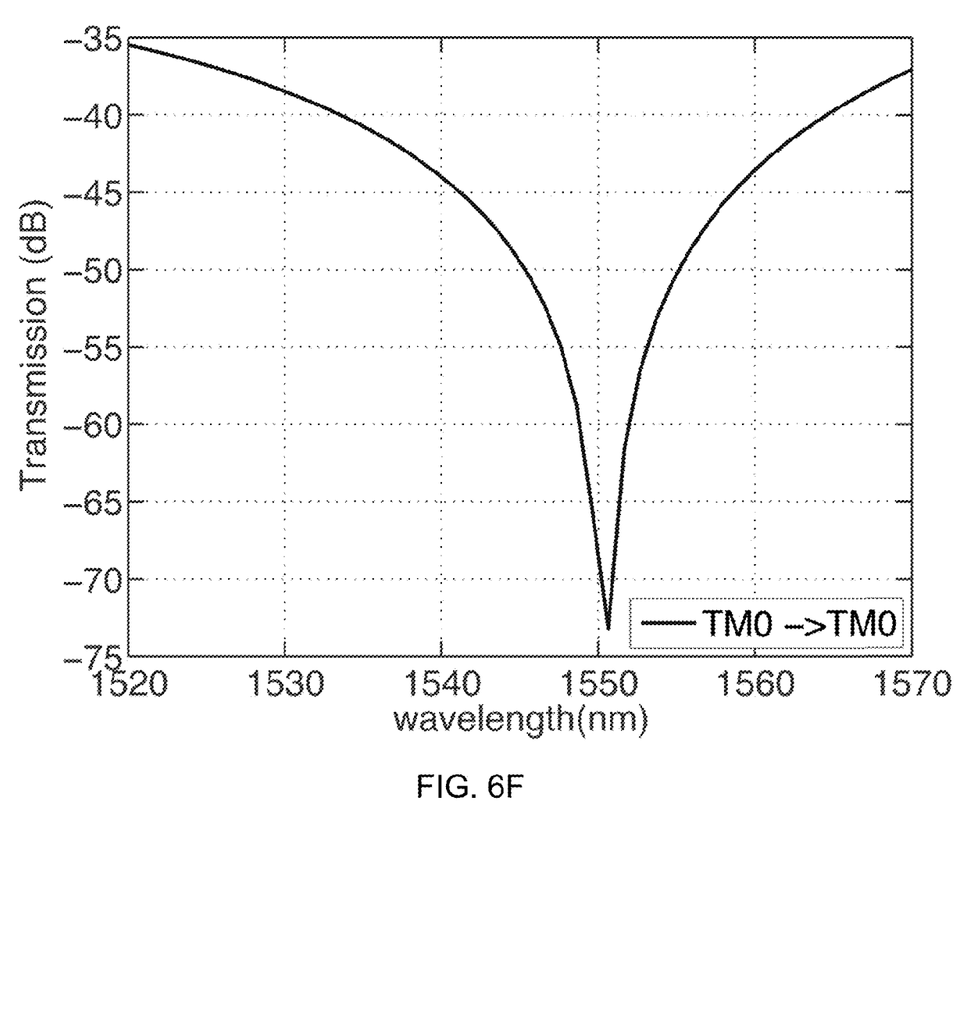
FIG. 6F is a plot of simulated TM0-to-TM0 polarization extinction ratio (PER) as a function of wavelength of the polarization rotator of FIG. 6A.
Figure 6G:
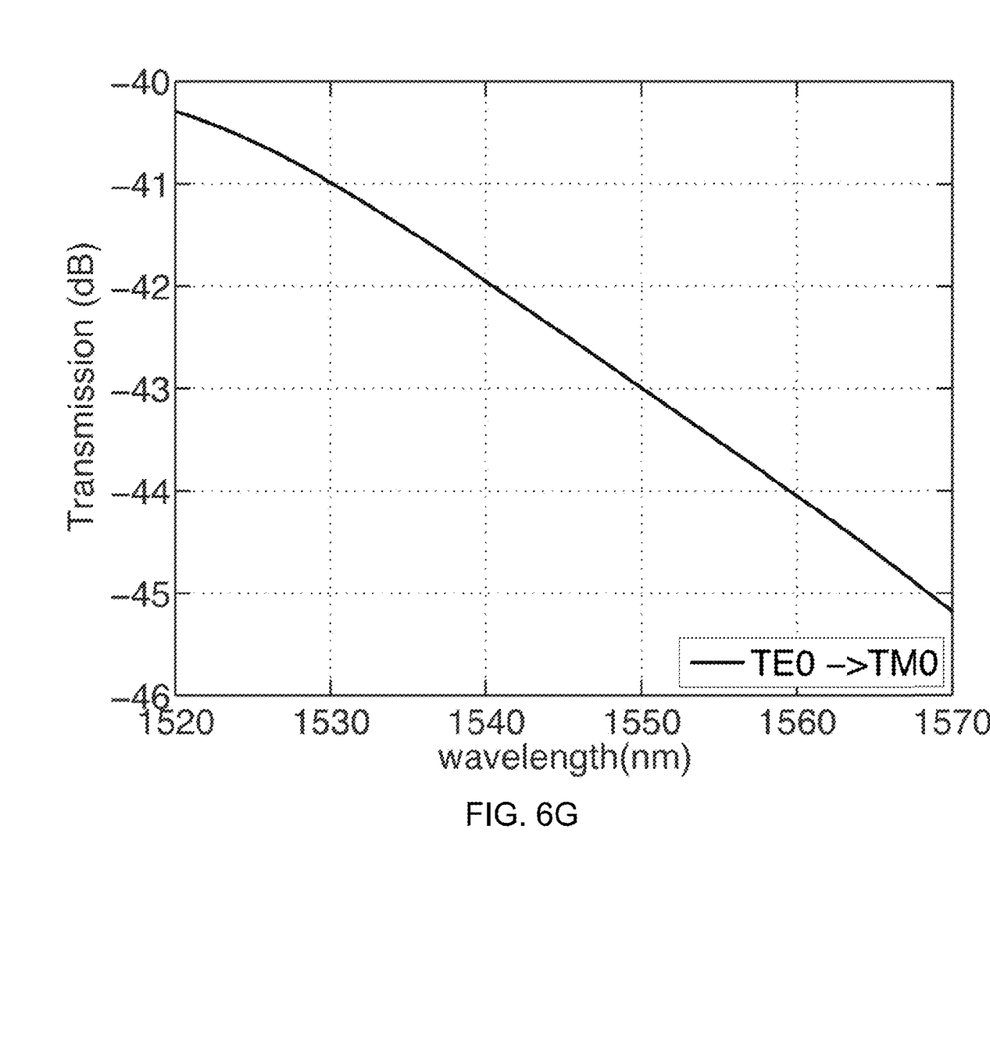
FIG. 6G is a plot of simulated TE0-to-TM0 polarization crosstalk as a function of wavelength of the polarization rotator of FIG. 6A.
Figure 6H:
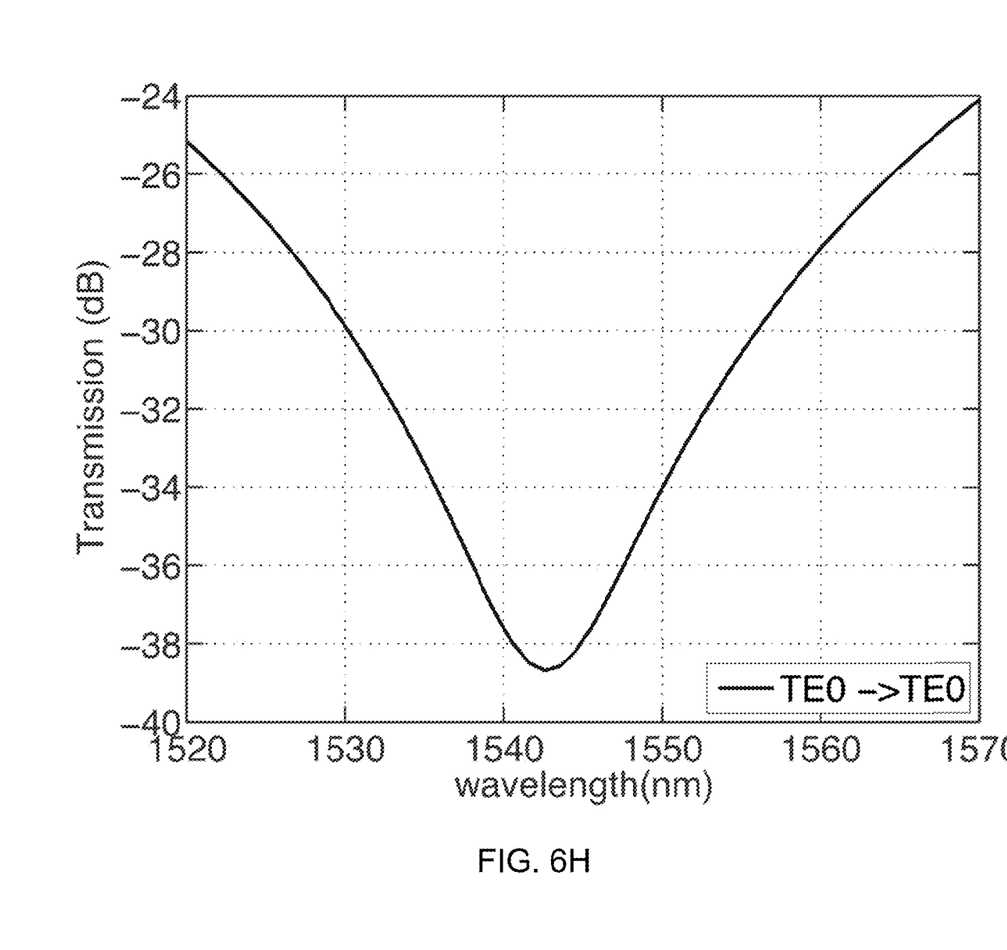
FIG. 6H is a plot of simulated TE0-to-TE0 PER as a function of wavelength of the polarization rotator of FIG. 6A.

FIG. 6E is a plot of simulated TM0-to-TE0 polarization-rotation loss as a function of wavelength of the polarization rotator of FIG. 6A. In the embodiment illustrated, the TM0-to-TE0 polarization-rotation loss is less than about 0.24 dB across the C-band. FIG. 6F is a plot of simulated TM0-to-TM0 polarization extinction ratio (PER) as a function of wavelength of the polarization rotator of FIG. 6A. In the embodiment illustrated, the TM0-to-TM0 PER is greater than about 35 dB across the C-band. FIG. 6G is a plot of simulated TE0-to-TM0 polarization crosstalk as a function of wavelength of the polarization rotator of FIG. 6A. In the embodiment illustrated, the TE0-to-TM0 polarization crosstalk is less than about −40 dB across the C-band. FIG. 6H is a plot of simulated TE0-to-TE0 PER as a function of wavelength of the polarization rotator of FIG. 6A. When a TE0 mode is launched into the polarization rotator, significant power loss occurs due to scattering, resulting in a TE0-to-TE0 PER of greater than about 25 dB across the C-band.

Figure 7:
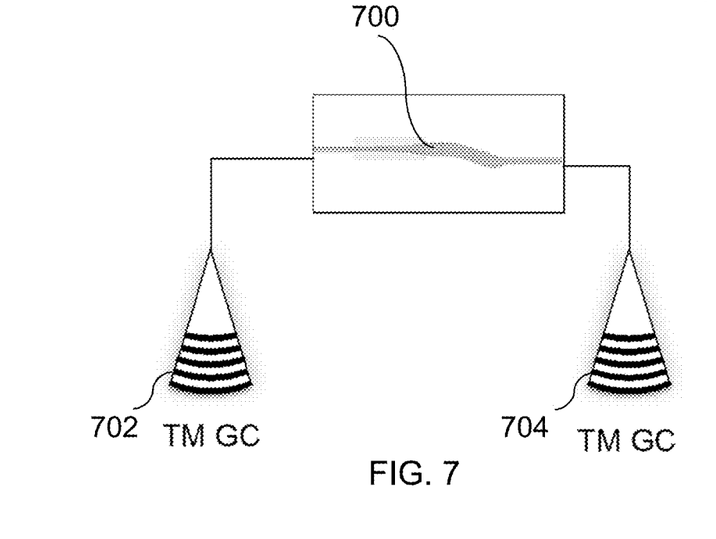
FIG. 7 is a schematic diagram of a test structure for measuring a TM0-to-TM0 PER of a TM0-TE0 polarization rotator.

FIG. 7 is a schematic diagram of a test structure for measuring a TM0-to-TM0 PER of a TM0-TE0 polarization rotator 700, e.g., at the wafer scale. The test structure includes an input TM-mode grating coupler 702, which is configured to launch input TM0-mode light into the polarization rotator 700, via the input port of the bi-layer taper, and an output TM-mode grating coupler 704, which is configured to receive output TM0-mode light from the polarization rotator 700, via the first port of the bent taper. By monitoring the power of the TM0-mode light, e.g., with an optical power meter, the TM0-to-TM0 PER of the polarization rotator 700 can be determined.

Figure 8:
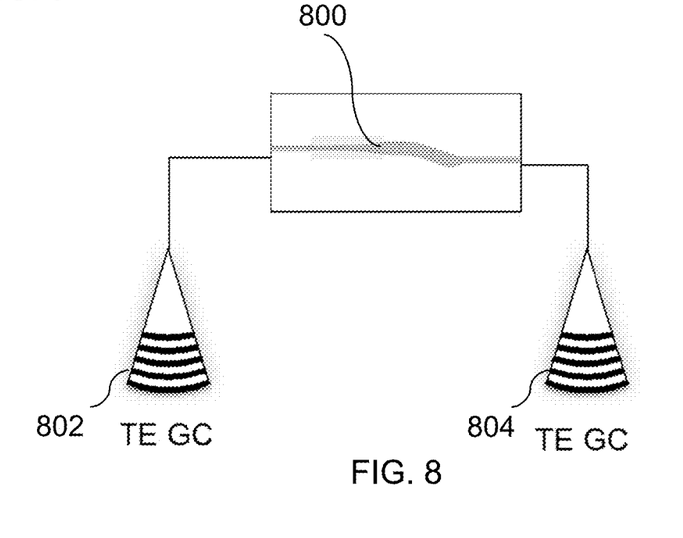
FIG. 8 is a schematic diagram of a test structure for measuring a TE0-to-TE0 PER of a TM0-TE0 polarization rotator.

FIG. 8 is a schematic diagram of a test structure for measuring a TE0-to-TE0 PER of a TM0-TE0 polarization rotator 800, e.g., at the wafer scale. The test structure includes an input TE-mode grating coupler 802, which is configured to launch input TE0-mode light into the polarization rotator 800, via the input port of the bi-layer taper, and an output TE-mode grating coupler 804, which is configured to receive output TE0-mode light from the polarization rotator 800, via the first port of the bent taper. By monitoring the power of the TE0-mode light, e.g., with an optical power meter, the TE0-to-TE0 PER of the polarization rotator 800 can be determined.

Figure 9:
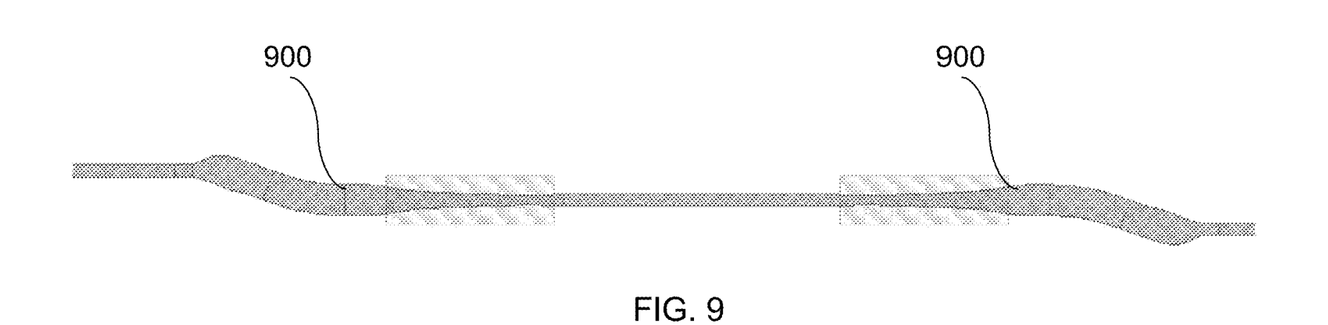
FIG. 9 is a schematic diagram of a test structure for measuring an insertion loss of a TM0-TE0 polarization rotator.

FIG. 9 is a schematic diagram of a test structure for measuring an insertion loss of a TM0-TE0 polarization rotator 900, e.g., at the wafer scale. The test structure includes at least one pair of cascaded polarization rotators 900 that are substantially identical, but oppositely oriented, with the input ports of the bi-layer tapers in optical communication. By cascading a plurality of such polarization-rotator pairs, the accuracy of the insertion-loss measurement may be increased. Advantageously, the test structure typically has a compact footprint. For example, since the device length of the polarization rotator 900 is typically less than about 20 µm, e.g., about 15 µm, an embodiment of a test structure including 10 cascaded polarization rotators 900 may have an overall length that is less than about 250 µm, e.g., less than about 200 µm. Such a test structure could be formed in spare space on a chip, e.g., a system chip, to enable wafer-scale device characterization. For example, wafer-scale test structures formed in system chips could be used to help pre-select chips or to predict the performance of systems. In some embodiments, a plurality of such test structures are formed, each with a different number of polarization-rotator pairs, and the insertion loss per device is determined by analyzing the transmission data for each of the test structures.

Figure 10:
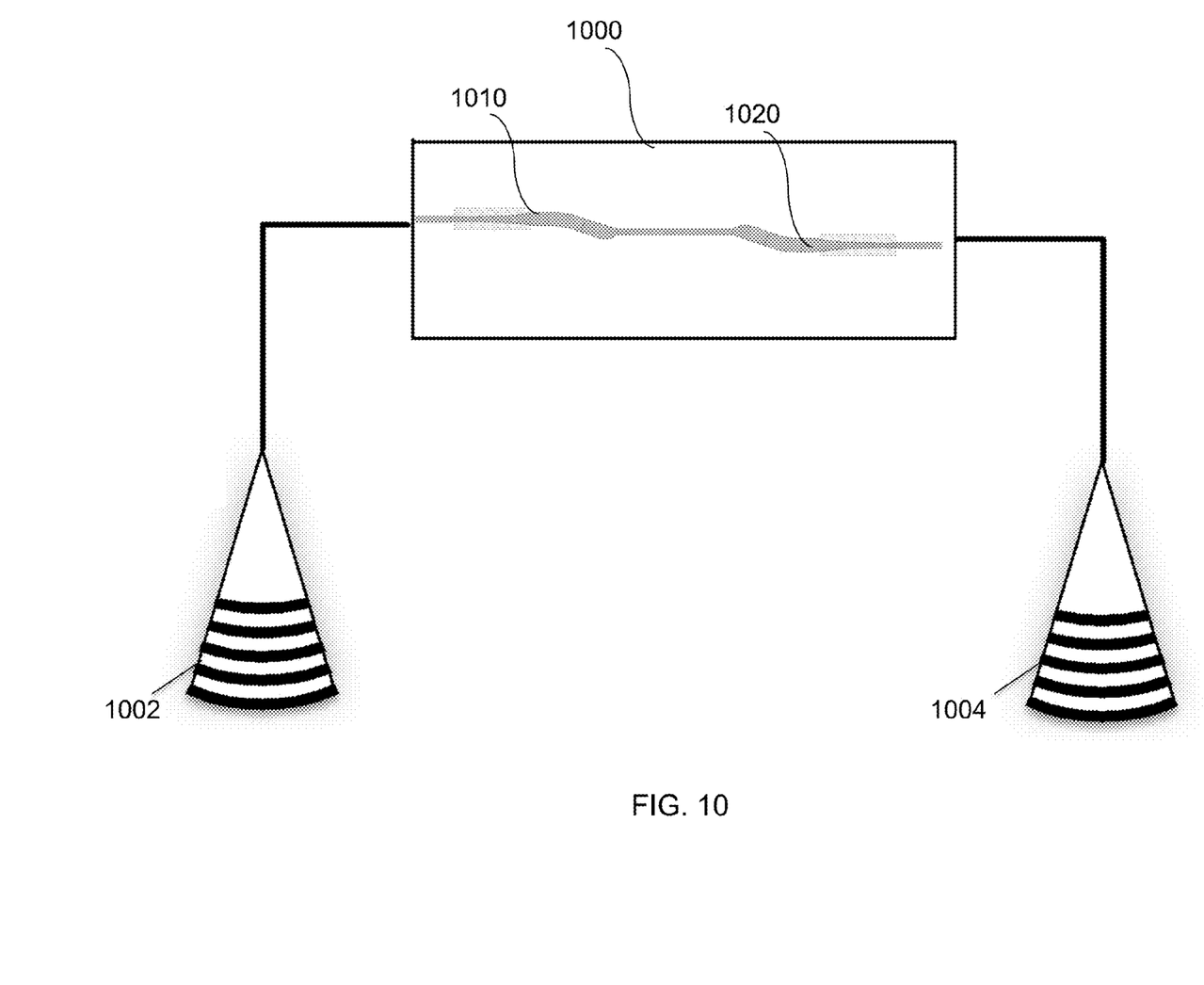
FIG. 10 is a schematic diagram of a TM0-pass polarizer.

Two TM0-TE0 polarization rotators can be cascaded to form an on-chip polarizer. Typically, the polarizer is a TM0-pass polarizer that is configured to pass substantially only TM0-mode light. FIG. 10 is a schematic diagram of a TM0-pass polarizer 1000 including a first polarization rotator 1010 and a second polarization rotator 1020, as well as an optional input grating coupler 1002 and an optional output grating coupler 1004. The first polarization rotator 1010 and the second polarization rotator 1020 are substantially identical, but oppositely oriented, with the first ports of the bent tapers in optical communication. Accordingly, the first polarization rotator 1010 is configured to perform TM0-to-TE0 polarization rotation, and the second polarization rotator 1020 is configured to perform TE0-to-TM0 polarization rotation. In this TM0-pass polarizer 1000, an input TM0 mode can be passed, but an input TE0 mode will be scattered.

Figure 11:
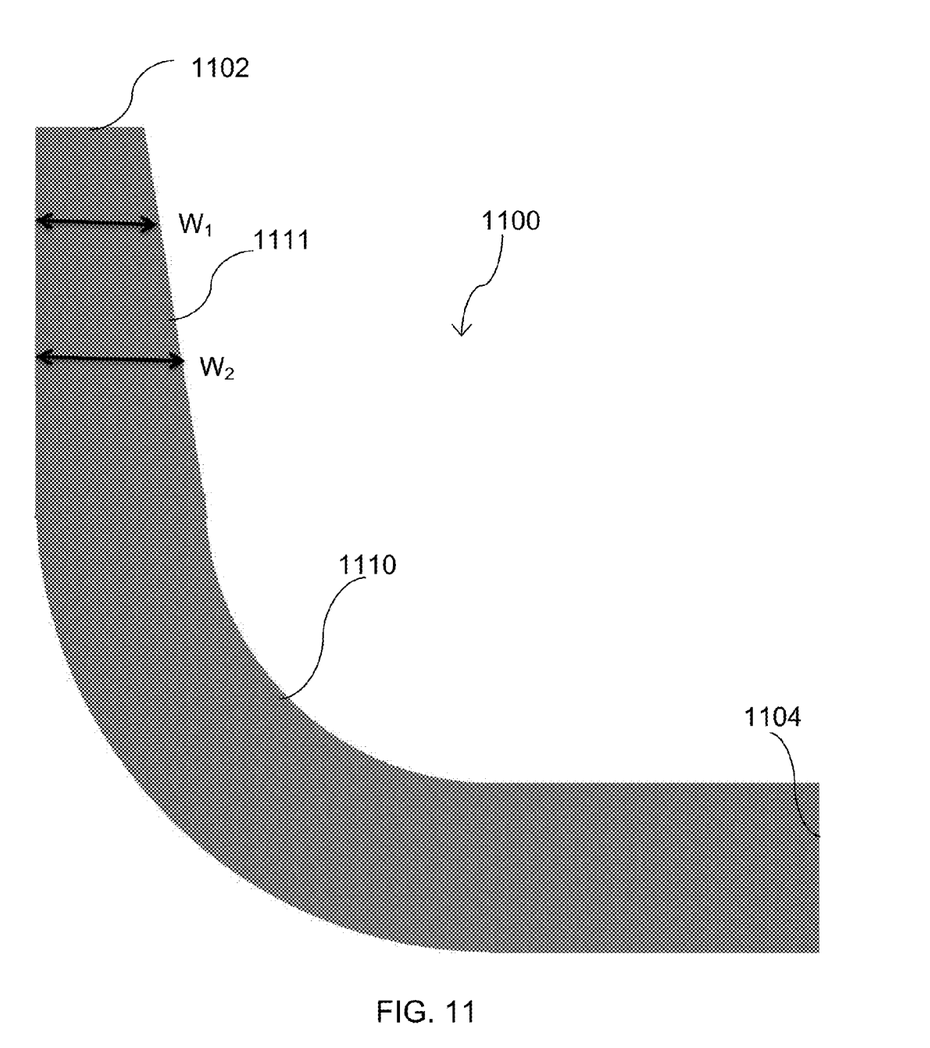
FIG. 11 is a schematic diagram of an L-shaped bent taper.

FIG. 11 is a schematic diagram of an L-shaped bent taper 1100. The bent taper 1100 has a narrower first port 1102 and a wider second port 1104, and includes a single in-plane waveguide bend 1110, which is formed as an L-bend, e.g., a 90° bend. The waveguide bend 1110 includes a tapered portion 1111 proximate to the first port 1102, having a waveguide width that tapers towards the first port 1102. The tapered portion 1111 has a plurality of different waveguide widths, two of which, $W_1$ and $W_2$, are illustrated. As the bent taper 1100 is reciprocal, either of the first port 1102 and the second port 1104 may serve as an input port to the bent taper 1100, and the other of the first port 1102 and the second port 1104 may serve as an output port to the bent taper 1100.

In various embodiments, the devices described herein may be configured to operate in one or more of the wavelength ranges described in Table I.

TABLE I

| Band | Description | Wavelength Range (nm) |
| --- | --- | --- |
| O-band | original | 1260 to 1360 |
| E-band | extended | 1360 to 1460 |
| S-band | short-wavelength | 1460 to 1530 |
| C-band | conventional ("erbium window") | 1530 to 1565 |
| L-band | long-wavelength | 1565 to 1625 |
| U-band | ultralong-wavelength | 1625 to 1675 |

TABLE I-continued

In various embodiments, the devices described herein may be fabricated using any suitable material system. Typically, the devices are fabricated using an SOI material system. Alternatively, the devices could be fabricated using a silica-on-silicon material system, a silicon nitride material system, a silicon oxynitride material system, or a III-V material system, for example. The optical waveguide components of the devices are typically formed as ridge waveguides or rib waveguides.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. An optical waveguide component with test structure, comprising:
   a first bent taper configured as a mode converter comprising: a first port, a second port, and a first waveguide bend proximate to the first port, wherein the first waveguide bend includes a tapered portion extending along at least a portion thereof proximate to the first port, the tapered portion including a waveguide width that tapers towards the first port;
   a first mode-conversion element in optical communication with the first bent taper, wherein the mode-conversion element and the first bent taper form a first polarization rotator;
   an input grating coupler configured to launch input light into the optical waveguide component; and
   an output grating coupler configured to receive output light from the optical waveguide component; and
   wherein the output grating coupler is configured to be coupled to an optical power meter for measuring power losses across the optical waveguide component.

2. The optical waveguide component with test structure of claim 1, wherein the first bent taper is S-shaped and further comprises a second waveguide bend connected to the first waveguide bend and proximate to the second port, wherein the first waveguide bend and the second waveguide bend have opposite curvature directions.

3. The optical waveguide component with test structure of claim 2, wherein the first waveguide bend and the second waveguide bend are circular waveguide bends.

4. The optical waveguide component with test structure of claim 3, wherein the first waveguide bend and the second waveguide bend have a substantially same center radius of curvature.

5. The optical waveguide component with test structure of claim 2, wherein the first mode conversion element comprises a bi-layer taper having an input port and an output port, wherein the output port of the bi-layer taper is connected to the second port of the first bent taper;
   wherein the bi-layer taper includes a first layer with a width that continuously tapers from the output port to the input port; and
   wherein the bi-layer taper includes a second layer with a width that initially tapers and then widens from the output port to the input port.

6. The optical waveguide component with test structure of claim 1, wherein the first bent taper is L-shaped.

7. The optical waveguide component with test structure of claim 1, wherein the waveguide width of the tapered portion tapers at a varying rate towards the first port.

8. The optical waveguide component with test structure of claim 1, wherein the waveguide width of the tapered portion is asymmetric with respect to a center arc of the first waveguide bend.

9. The optical waveguide component with test structure of claim 1, wherein the first bent taper transitions from single-mode at the first port to multimode at the second port.

10. The optical waveguide component with test structure of claim 1, further comprising a second bent taper substantially identical to the first bent taper, but oppositely oriented; wherein the first port of the first bent taper is connected to a first port of the second bent taper.

11. The optical waveguide component with test structure of claim 10, wherein the second bent taper is configured as a mode converter.

12. The optical waveguide component with test structure of claim 11, further comprising a second mode-conversion element in optical communication with the second bent taper, wherein the second mode-conversion element and the second bent taper form a second polarization rotator.

13. The optical waveguide component with test structure of claim 12, wherein the first mode-conversion element has an input port and an output port; wherein the first mode-conversion element is configured to receive a fundamental transverse magnetic (TM0) mode via the input port, to convert the TM0 mode to an intermediate mode, and to provide the intermediate mode via the output port; wherein the first bent taper is configured to receive the intermediate mode via the second port, to convert the intermediate mode to a TE0 mode, and to provide the TE0 mode via the first port; and wherein the first polarization rotator is configured to provide TM0-to-TE0 polarization rotation.

14. The optical waveguide component with test structure of claim 12, wherein the second mode-conversion element comprises a second bi-layer taper having an input port and an output port, and wherein the output port of the second bi-layer taper is connected to the second port of the second bent taper.

15. The optical waveguide component with test structure of claim 14, wherein the first bi-layer taper includes a first layer and a second layer overlying the first layer, wherein the first layer has a layer width that continuously tapers from the output port to the input port, and wherein the second layer has a layer width that initially tapers and then widens on going from the output port to the input port.

16. The optical waveguide component with test structure of claim 13, wherein the second bend taper is configured to receive a TE0 mode via the first port, to convert the TE0 mode to a TE1 mode, and to provide the TE1 mode via the second port;
   wherein the second mode conversion element is configured to receive the TE1 mode via the output port, to convert the TE1 mode to a TM0 mode, and to provide the TM0 mode via the input port;
   wherein the second polarization rotator is configured to provide TE0-to-TM0 polarization rotation; and
   wherein the first polarization rotator and the second polarization rotator are cascaded to form a TM0-pass polarizer.

17. The optical waveguide component with test structure of claim 12, wherein the first polarization rotator and the second polarization rotator are cascaded to form a wafer-scale test structure, and wherein the wafer-scale test structure is formed in a system chip.

18. The optical waveguide component with test structure according to claim 1, further comprising:
   a system chip for supporting the first bent taper, the first mode conversion element, the first grating coupler, and the second grating coupler in a spare space thereon; and
   a system of optical components including an additional bent taper, substantially the same as the first bent taper, and an additional mode conversion element, substantially the same as the first mode conversion element.

* * * * *